United States Patent Office 3,455,868
Patented July 15, 1969

3,455,868
FRICTION COMPOSITION AND FRICTION ELEMENT THEREOF
William J. D'Alessandro, Old Bridge, N.J., assignor to Union Carbide Corporation, a corporation of New York
No Drawing. Filed Nov. 24, 1964, Ser. No. 413,640
Int. Cl. C08g *43/02, 51/12;* F16d *69/02*
U.S. Cl. 260—38                                   15 Claims

ABSTRACT OF THE DISCLOSURE

Friction composition of particulate friction material and a binder of a heat-hardenable resin and thermoplastic polyarylene polyether.

---

This invention relates to improved friction compositions comprising a thermoplastic polyarylene polyether and to improved friction elements thereof.

It is known that friction elements which are intended for heavy duty brake or clutch operations in motor vehicles must withstand severe service conditions. In use they are subjected to rigorous treatment by repeated and oftentimes prolonged braking or clutching applications which develop high temperatures, above 500° F., in the friction elements, these temperatures frequently exceeding 1000° F. on the friction surface of the elements and progressively decreasing inwardly of such surface. These high temperatures, especially when occurring during high speed stops or following repeated applications of the brakes, tend to depolymerize or otherwise decompose the organic binder substances heretofore employed as the principal essential ingredients of the binders in the friction elements, such ingredients comprising various heat-hardenable resins such as phenol-aldehyde resins and oil modified resins. Decomposition of the friction material results in the formation of gaseous or liquid products of heat decomposition. In some cases this causes marked softening of the friction element with consequent loss of braking efficiency. In other cases, the depolymerized or otherwise liquid products of heat decomposition appear on the friction surface of or within the friction elements so as to cause the friction elements heretofore employed to exhibit a loss of stability of friction characteristics originally existnig, and to produce after vigorous braking application a condition which automotive engineers customarily refer to as "lining fade."

In many instances the aforesaid liquefied decomposition products may produce a glaze on the surface of the friction element. This glaze must be removed by subsequent brake or clutch operations to restore the original surface conditions. If subsequent operations are unable to eradicate the glaze, the friction element will remain at a low level of friction and yield an unsafe functioning of the device in which it is used. Moreover, the aforesaid decomposition may in some instances cause an excess of abrasive material of the lining composition to be present on the friction surface and produce a condition known as "over-recovery," the friction elements then having a coefficient of friction upon cooling exceeding that which the friction element possessed originally. Since it is desirable to maintain the stability of friction characteristics of the friction elements, it will be understood that these conditions are to be inhibited and preferably avoided.

A further problem heretofore associated with known friction elements has been the impossibility to achieve in a satisfactory manner a relatively high level of substantially uniform friction action over a wide temperature range of the friction element. By high level of friction we mean a coefficient above 0.4. This property is much sought after because modern brake and clutch operations can be made more effective if the friction elements possess this feature. It will be understood for instance that for braking stops made at the same speed and at the same rate of deceleration, a friction material which possesses a high level of friction action and which is capable of maintaining the same over a wide temperature range will provide more positive response and will require a lower pedal effort than would be true of a conventional friction material neither possessing a uniform level of friction action or a high friction ability over a substantial temperature range.

Many attempts have been made to overcome these difficulties by modifying the binder. Thermoplastic materials have been considered but have been found to be totally unsuitable because of their notoriously poor thermal and dimensional stability at elevated temperatures. Because of this deficiency, the incorporation of thermoplastic materials in a heat-hardenable binder actually impairs friction and wear performance at elevated temperatures normally encountered in friction applications.

It is an object, therefore, of this invention to provide improved friction compositions and elements thereof which exhibit higher and more stable coefficient of friction values and lower wear over a wide temperature range and at high temperatures.

It is a further object of this invention to provide an improved friction element having excellent fade resistance, the ability to recover rapidly after excessive heating when use has produced a fading condition, and which does not over-recover on cooling but returns substantially to its original friction level.

It is a yet further object of this invention to provide friction compositions and elements thereof comprising a heat-hardenable binder modified with thermoplastic material but without the drawbacks hertofore met with thermoplastic materials Broadly, the improved friction composition of this invention and elements formed therefrom comprise a major portion by weight of a particulate friction material the greater portion of which is a filamentous friction material and a binding amount, that is an amount sufficient to bind the friction material, of a binder comprising a heat-hardenable resin and from about 1 to about 50 percent by weight, based on the weight of the heat-hardenable resin, of a thermoplastic polyarylene polyether described in greater detail below.

Thermoplastic polyarylene polyethers used in the present invention are the linear thermoplastic polymers having a basic structure composed of recurring units having the formula

—O—E—O—E'— wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residua E and E' are characterized in this manner since they are conveniently prepared by the reaction of an alkali metal double salt of a dihydric phenol and a dihalobenzenoid compound as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis(4-hydroxyphenyl)propane, 1,1-bis(4-hydroxyphenyl) - 2 - phenylethane, bis(4 - hydroxyphenyl)methane, or the chlorinated derivatives containing one or two chlorines on each aromatic ring. Other suitable dinuclear dihydric phenols are the bisphenols of a symmetrical or unsummetrical joining group as, for example, either oxygen (—O—), carbonyl

sulfide (—S—), sulfone

or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

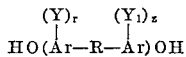

wherein Ar is an aromatic group and preferably is a phenylene group, Y and $Y_1$ can be the same or different inert substituent groups as alkyl groups having from 1 to 4 carbon atoms, halogen atoms, i.e., fluorine, chlorine, bromine, or iodine, or alkoxy radicals having from 1 to 4 carbon atoms, r and z are integers having a value of from 0 to 4, inclusive, and R is representative of a bond between aromatic carbon atoms as in dihydroxydiphenyl, or is a divalent radical, including for example, inorganic radicals as

—O—, —S—, —S—S—, —$SO_2$—, and divalent organic hydrocarbon radicals such as alkylene, alkylidene, cycloaliphatic, or the hlaogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis(hydroxyphenyl)alkanes such as 2,2-bis(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)propane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
2,2-bis(4-hydroxyphenyl)-1-phenylpropane,
2,2-bis(4-hydroxyphenyl)-1,1,1,3,3,3-hexafluoropropane
and the like;

Di(hydroxyphenyll)sulfones such as bis(4-hydroxyphenyl)sulfone, 2,4'-dihydroxydiphenylsulfone, 5'-chloro-2,4'-dihydroxydiphenylsulfone, 5'-chloro-4,4'-dihydroxydiphenylsulfone, and the like;

Di(hydroxyphenyl)sulfones such as bis(4 - hydroxyl)ether the 4,3'-, 4,2'-, 2,2'-, 2,3'-dihydroxydiphenyl ethers, 4,4'-dihydroxy-2,6-dimethyldiphenyl ether, bis(4-hydroxy-3-isobutylphenyl)ether, bis(4-hydroxy - 3 - isopropylphenyl)ether, bis(4-hydroxy - 3 - chlorophenyl)ether, bis(4-hydroxy - 3 - fluorophenyl)ether, bis(4-hydroxy - 3 - bromophenyl)ether, bis(4-hydroxynaphthyl)ether, bis(4 - hydroxy-3-chloronaphthyl)ether, 4,4'-dihydroxy-3,6-dimethoxydiphenyl ether, 4,4' - dihydroxy-2,5-diethoxydiphenyl ether, and the materials.

It is also contemplated to use a mixture of two or more different dihydric phenols to accomplish the same ends as above. Thus when referred to above the E residuum in the polymer structure can actually be the same or different aromatic residue.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzoid compounds. Preferred are the strong activating groups such as the sulfone group

bonding two halogen substituted benzenoid nuclei as in the 4,4'-dichlorodiphenylsulfone and 4,4'-difluorodiphenylsulfone, although such other strong withdrawing groups hereinafter mentioned can also be used with ease. It is further preferred that the ring contain no electron supplying groups on the same benzeneoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951), and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types;

(a) Monovalent groups that activate one or more halogens on the same ring as a nitro group, phenylsulfone, or alkylsulfone, cyano, trifluoromethyl, nitroso, and hetero nitrogen as in pyridine.

(b) Divalent group which can activate displacement of halogens on two different rings, such as the sulfone group

the carbonyl group

the vinyl group

the sulfoxide group

the azo-group —N=N—; the saturated fluorocarbon groups —CF$_2$CF$_2$—; organic phosphine oxides

where R is a hydrocarbon group, and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

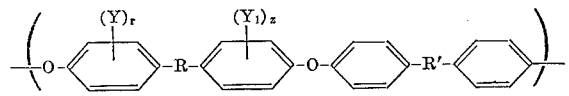

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and Y$_1$ each represent inert substituent groups selected from the group consisting of halogen, alkyl groups having from 1 to 4 carbon atoms, and alkoxy groups having from 1 to 4 carbon atoms and where $r$ and $z$ are integers having a value from 0 to 4, inclusive. Even more preferred are the thermoplastic polyarylene polyethers of the above formula wherein $r$ and $z$ are zero, R is divalent connecting radical

wherein R'' represents a member of the group consisting of hydrogen, lower alkyl, lower aryl, and the halogen substituted groups thereof, and R' is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

The specific solvents employed have the formula

wherein each R represents a monovalent lower hydrocarbon group free of aliphatic unsaturation on the alpha carbon atom, and preferably contains less than about 8 carbon atoms or when connected together represents a divalent alkylene group with $z$ being an integer from 1 to 2 inclusive. In all of these solvents, all oxygens and two carbon atoms are bonded directly to the sulfur atom. Specifically mentionable of these solvents are dimethylsulfoxide, dimethylsulfone, diethylsulfoxide, diethylsulfone, diisopropylsulfone, tetrahydrothiophene 1,1-dioxide (commonly called tetramethylene sulfone or sulfolane), tetrahydrothiophene-1 monoxide, and the like.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

In the polymeriztion reactions described herein substantially anhydrous conditions are maintained before and during the reaction. While amounts of water up to about one percent can be tolerated amounts of water substantially greater than this are desirably avoided. In order to secure high molecular weight polymers, the system should be substantially anhydrous, and preferably with less than 0.5 percent by weight water in the reaction mixtures.

In the two-step process described above, where the alkali metal salt of the dihydric phenol is prepared in situ in the reaction solvent, the dihydric phenol and an alkali metal hydroxide are admixed in essentially stoichiometric amounts and normal precautions taken to remove all the water of neutralization preferably by distillation of a water-containing azeotrope from the solvent-metal salt mixture. Benzene, xylene, halogenated benzenes or other inert organic azeotrope-forming organic liquids are suitable for this purpose.

The azeotrope former can be one either miscible or immiscible with the sulfone or sulfoxide major solvent. If it is not miscible it should be one which will not cause precipitation of the polymer in the reaction mass. Heptane is such a solvent. It is preferred to employ azeotrope formers which are miscible with the major solvents and which also act as cosolvents for polymer during polymerization. Chlorobenzene, dichlorobenzene and xylene are azeotrope formers of this class. Preferably the azeotrope former should be one boiling below the decomposition temperature of the major solvent and be perfectly stable and inert in the process, particularly inert to the alkali metal hydroxide when the alkali metal salt of the dihydric phenol is prepared in situ in the presence of the inert diluent or azeotrope former. It has been found that chlorobenzene and o-dichlorobenzene serve particularly well as the inert diluent and are able to significantly reduce the amount of the sulfone or sulfoxide solvent necessary. The cosolvent mixture using even as much as 50 percent of the halogenated benzene with dimethylsulfoxide, for example, not only permits the formed polymer to remain in solution and thus produce high molecular weight polymers, but also provides a very economical processing system, and an effective dehydration operation.

The reaction between the dihalobenzenoid compound and the alkali metal salt of the bisphenol proceeds on an equimolar basis. This can be slightly varied but as little a variation of 5 percent away from equal molar amounts seriously reduces the molecular weight of the polymers.

The reaction of the dihalobenzenoid compound with the alkali metal salt of the dihydric phenol readily proceeds without need of an added catalyst upon the application of heat to such a mixture in the selected sulfone or sulfoxide solvent.

Also desirable is the exclusion of oxygen from the reaction mass to avoid any possibility of oxidative attack to the polymer or to the principal solvent during polymerization.

Reaction temperatures above room temperature and generally above 100° C., are preferred. More preferred are temperatures between about 120° C. to 160° C. Higher temperatures can of course be employed, if desired, provided that care is taken to prevent degradation or decomposition of the reactants, the polymer and the solvents employed. Also temperatures higher than 100° C. are preferred in order to keep the polymer in solution during the reaction since these sulfoxide and sulfone solvents are not particularly good solvents for the polymer except in the hot condition.

The polymer is recovered from the reaction mass in any convenient manner, such as by precipitation induced by cooling the reaction mass or by adding a nonsolvent for the polymer, or the solid polymer can be recovered by stripping off the solvent at reduced pressures or elevated temperatures.

Since the polymerization reaction results in the formation of the alkali metal halide on each coupling reaction, it is preferred to either filter the salts from the polymer solution or to wash the polymer to substantially free it from these salts.

Thermoplastic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

As stated above, the improved friction composition of this invention, and elements formed therefrom, comprise a major portion of a particulate friction material and a binding amount of a binder comprising a heat-hardenable resin and a thermoplastic polyarylene polyether.

The phrases "friction composition" and "friction element" as used herein and in the appended claims is intended to be descriptive of that class of compositions and elements used to develop a high coefficient of friction when applied against a surface without substantially cutting, wearing away or rubbing off that surface but which are designed to gradually wear away in use to maintain the original surface conditions of the friction composition and element. For this reason, the major portion of the particulate friction material, that is, the filamentous friction material, cannot be harder than the surface against which the friction compositions and elements of this invention are applied.

It is preferred that the particulate friction material be heat resistant and essentially composed of filamentous and granular friction materials. Best results are attained when the filamentous ingredients predominate and constitute at least about 50% by weight of the friction material. In this connection, long, medium or short asbestos fiber such as crysotile asbestos is preferred for its desirable high heat resistant handling and reinforcing properties. Moreover, best braking performance is obtained when the particular materials are inorganic in character although a substantial portion may be organic when in a form heated to render them substantially infusible at temperatures of 600° F. and preferably higher. Normally, it is preferred not to use organic particulate ingredients in amounts exceeding about 30% by weight of the friction material and not more than about 5% to 10% when such materials have not been heat treated as aforesaid.

Examples of filamentous particulate materials which may be used are inorganic fibers such as asbestos fiber, steel wool, bronze fiber, glass fiber, and calcium silicate fiber; organic fibers such as cellulose fiber; and synthetic resin fibers such as polyacrylonitrile fiber, polyethylene terephthalate fiber; and synthetic resin fibers of these types heat treated to render them infusible at temperatures of 600° F. and higher.

Suitable asbestos fiber has a grade of 1–9, preferably 3–7, as graded by the Quebec Screen Test (Ross, J. G., Can. Dept. Mines, Mines Branch No. 707, 50–51 (1931), as revised Dec. 1, 1942). Other filamentous friction materials can be graded by this test but in any case the filamentous material should not be harder than the surface against which the friction compositions and elements of this invention are applied.

Other particulate friction materials conventionally used in friction compositions can also be present in the compositions and elements of this invention. Such materials are employed to densify, to adjust the thermal properties, and to fortify and/or control friction. Still other materials are used to impart special properties such as, for example, resistance to moisture sensitivity, wear and noise.

Examples of other particulate friction materials are barium sulfate, cork dust, silica, mica, metal particles, litharge, clay, calcium oxide, zinc oxide, barytes, rotten stone, zinc dust, Alundum, graphite, molybdenum disulfide, iron oxide, and organic friction particles such as Cardolite 753. Cardolite 753 is an organic particulate resin made by Minnesota Mining and Manufacturing Company. It is prepared by reacting together and heat curing to the infusible state the residue of the distillation of cashew nut shell liquid, furfural and diethyl sulfate, as described in U.S. Patent No. 2,317,587 and then comminuting the infusible mass to a granular material.

The heat-hardenable resins are those generally employed in friction compositions. Typical heat-hardenable resins are phenol-aldehyde, amine-aldehyde and modified, e.g., amine modified, phenol-aldehyde resins. Both novolaks and resoles are useful herein, the former in combination with hardeners. The phenolic type of resin used can be a two-step novolak, a one-step resole or a mixture of the two. Where a two-step novolak is used substantially alone, formaldehyde in any form, such as paraform and trioxane, or compounds containing available formaldehyde such as hexamethylenetetramine and methylol containing resins (resoles), are required to cross-link and thermoset the system. A full description of useful resins is given in the book entitled "The Chemistry of Phenolic Resins" by Robert W. Martin, published in 1956 by John Wiley & Sons, and also the book entitled "Phenoplasts" by T. S. Carswell, published in 1947 by Interscience Publishers. These and other heat-hardenable resins are disclosed in U.S. Patent No. 2,559,664 to Ries et al., U.S. Patent No. 2,779,668 to Daniels et al., and U.S. Patent No. 2,521,911 to Greenlee et al.

The term "phenol-aldehyde resin" herein refers to acid or base catalyzed thermosetting resins of the resole or novolak type prepared from a phenol such as phenol, cresol, xylenol, p,t-butylphenol, p-phenylphenol, bisphenols and resorcinal and an aldehyde such as formaldehyde and furfural, such as described in U.S. Patent No. 2,585,196 to Walton; U.S. Patent No. 2,475,587 to Bender et al.; U.S. Patent No. 2,557,922 to Mazzucchelli et al.; U.S. Patent No. 2,617,785 to Pritchett et al.; U.S. Patent No. 2,675,335 to Rankin et al.; and U.S. Patent No. 2,552,025 to Barr et al.

The aforementioned publications and patents are incorporated herein by reference.

The components of the improved friction compositions and elements of this invention can be employed in amounts normally employed in conventional friction compositions and elements. For example, friction material as defined herein is employed in a major amount by weight, that is in amounts ranging between about 70 to about 95 percent by weight. Weight percentages as used herein in and in the appended claims are based on the total dry weight of the friction composition or element.

A binding amount of the binder, that is, an amount sufficient to bind together the particulate friction material will, of course, depend on the amount of friction material used, and the kinds and number of components present in the friction material. Generally, binder amounts falling within the range of from about 5 to about 30 percent by weight are suitable. A binder comprising a heat-hardenable resin and from about 1 to about 50 percent, preferably from about 5 to 25 percent by weight, of a thermoplastic polyarylene polyether provides optimum improvement in friction and wear performance without undesirably increasing the cost of the binder.

A heat-hardenable resin can be modified according to this invention by any process which insures for complete mixing of the thermoplastic polyarylene polyether and heat-hardenable resin. For example, they can be dry blended in particulate form, dissolved in compatible solvents and mixed together or the polyarylene polyether in particulate form can be dissolved in molten heat-hardenable resin which is subsequently cooled and ground into a powder.

In general, it can be stated that in order to obtain complete and adequate bonding, the components of the compositon are mixed and/or molded under conditions which allow for complete and thorough wetting of the particulate friction material by the binder. Wetting can be accomplished by fluxing (flow under heat and usually pressure) the binder while in contact with the friction material by mixing a solution of the binder in a suitable solvent with the friction fortifying material and filler, and by like and equivalent methods.

The mixing of the friction material and binder can be accomplished in any convenient manner so long as there is attained a thorough admixture of the components. Suitable apparatus for accomplishing this end include a kneader, a 2-roll mill, Banbury mixer, an extruder, and the like.

It should be evident that the compositions of this invention can be prepared for use in either a dry or wet form. In the dry form, the friction fortifying material and filler would be admixed with the binder in particulate form while in the wet form they would be admixed with a solution of the binder in a suitable solvent.

The compositions of this invention, either in the dry or wet form, can be molded into friction elements by conventional techniques such as those described in detail in the examples. For example, a dry or wet composition can be compression molded and directly cured in a suitably shaped mold into a friction element. Or, if desired, a wet composition can be extruded into a partly cured "preform" which can then be completely cured and formed into the desired shape in a suitable shaped mold by compression molding. Such an intermediate preform has particular utility since the composition and preform can be easily prepared by a fabricator having conventional equipment and sold to a special manufacturer equipped to form friction elements. The composition in dry or wet form could also be prepared and sold by itself to a manufacturer of friction elements.

The improved friction compositions and preforms thereof of this invention can be readily formed into improved friction elements such as clutch facings and brake facings and linings for use in all types of manual and power driven vehicles such as, railway cars, wagons, carriages, automobiles, buses, airplanes, tractors, trailers, trucks, trains, cycles, sleds and the like. The improved friction element of this invention is particularly useful as a brake lining for power and manual brakes in automobiles.

The following examples are intended to further illustrate the present invention without limiting the same in any manner. All parts and percentages are by weight unless indicated otherwise.

In the following examples and controls, compositions were prepared by either a dry or wet process. In the dry process, the friction fortifying material, heat resistant filler and powdered resin were mixed in a kneader for 15 minutes until a uniform mixture was obtained. The mixture was tumbled in a quart can on rolls for about 10 minutes. The mixture was subsequently molded into 2" x 1" x 5/16" thick curved brake lining specimen at 300° F. for 10 minutes using sufficient pressure (about 3000–4000 lbs. ram pressure) to completely close the mold. Gases were vented from the mold after the first and third minute. The specimens, which had a density of 2.0 gm./cc., were then postcured at 360° F. for 16 hours.

In the wet process, the friction fortifying material, heat resistant filler, and polymer solution were mixed in a kneader for 10 minutes until a uniform mixture was obtained. The mixture was then fed into a water-jacketed hopper of a 2" Bonnot extruder (manufactured by the Bonnot Company, division of the C. L. Gougler Machine Company, Canton, Ohio), equipped with a 1.5 horsepower variable speed drive and a socket-mounted extrusion worm. A 1 inch ribbon 3/8 inch thick was extruded from the mixture. The ribbon was dried at 175° F. for 8–16 hours and cut into 2 inch lengths which were subsequently molded into 2" x 1" x 5/16" thick curved brake lining specimens at 300° F. for 10 minutes using sufficient pressure (about 3000–4000 lbs. ram pressure) to completely close the mold. Gases were vented from the mold after the first and third minute. The specimens, which had a density of 1.8–2.0 gm./cc., were postcured at 360° F. for 16 hours.

After burnishing, the brake lining specimens were tested for coefficient of friction (COF) and wear in a Carson friction machine. The 12 inch diameter cast iron brake drum of this machine was heated to the desired temperature and rotated at 375 r.p.m. Two 75-pound weights were employed to hold the brake lining specimens against the inside of the rotating brake drum surface and apply the desired bearing pressure. Before testing each specimen was held against the rotating brake drum surface, at 200° C. until the surface was smooth with at least 95% of the surface area worn. After weighing each specimen, it was put through a series of test cycles each comprising applying the bearing pressure for 2 minutes and removing the specimen from the surface of the rotating drum for one-half minute. In testing at 200° C., two identical specimens were put through 16 test cycles and the coefficient of friction values recorded and averaged. In testing at 300° C., the same procedure as for 200° C. was followed except that the specimens were put through 8 test cycles. Each specimen was weighed after testing and the weight loss recorded. The data obtained was used to calculate the coefficient of friction and wear factor using the following equations:

(1) Coefficient of friction (COF) =
$$\frac{\text{Tangential force }^1,\text{ p.s.i.}}{\text{Normal force,}^2\text{ p.s.i.}}$$

(2) Work done = (0.178) (COF) (N) where N = the number of test cycles (3) Wear factor =
$$\frac{\text{Specimen weight loss}}{\text{Work done}}$$

[1] The tangential force at the face of the brake lining specimen was measured with a Hagan thrust torque unit and recorded on an Esterline Angus quick-trip pressure recorder.
[2] The normal force is the pressure applied to a specimen by the two weights used to hold it against the inside of the rotating brake drum.

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced viscosity} = \frac{t_s - t_o}{c \cdot t_o}$$

wherein:

$t_o$ is the efflux time of the pure solvent,
$t_s$ is the efflux time of the polymer solution,
$c$ is the concentration of the polymer solution expressed in terms of grams of polymer per 100 ml. of solution.

EXAMPLE 1

Preparation of thermoplastic polyarylene polyether

In a 250 ml. flask equipped with a stirrer, thermometer, a water cooled condenser and a Dean-Stark moisture trap filled with benzene, there were placed 11.42 grams of 2,2-bis(4-hydroxyphenyl)propane (0.05 mole), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the later to give a refluxing mixture at 130–135° C., consisting of the dipotassium salt of the 2,2-bis(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° and held at 130–140° with good stirring for 4–5 hours. The viscous, orange solution was poured into 300 ml. water, rapidly circulated in a Waring Blendor, and the finely divided white polymer was filtered and then dried in a vacuum oven at 110° for 16 hours. The yield was 22.2 g. (100%) and the reaction was 99% complete based on a titration for residual base.

The polymer had the basic structure

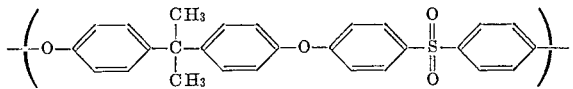

EXAMPLES 2–7

In these examples, compositions were prepared and brake lining specimens formed by the dry process described above. The compositions used were composed of the following basic ingredients.

Friction material: Parts by wt.
  Asbestos fibers _____ 57.5
  Barium sulfate _____ 22.5
Binder, powdered resin [1] _____ 20.0

[1] The powdered resin used was a two-step phenol-formaldehyde novolak resin sold under the designation BRP by the Union Carbide Corporation. Several such resins were used having different molecular weights and containing various amounts of hardener and thermoplastic polyarylene polyether prepared as described in Example 1 having a reduced viscosity of 0.49. The control composition was the same minus the thermoplastic polyarylene polyether. Four brake lining specimens of each composition were prepared and tested for coefficient of friction and wear factor at 200° C. and 300° C.

Results are summarized in Table I.

Table I demonstrates that the presence of thermoplastic polyarylene polyether in the composition improves friction, especially at the all important 200° C. level, as compared to the control and, furthermore, improved friction stability indicated by an average friction increase of only 0.04 from 200°–300° C. for Examples 2–7 as compared to an increase of 0.07 for the control. Also, in a more important area of wear factor of heat resistance, Examples 2–7 show significant improvement over the control at both the 200° C. and 300° C. test temperatures. In Examples 2, 4, and 6 the average wear factor was 11% to 19% lower at 200° C. and 300° C. as compared to the control, while in Examples 5 and 7, it was 24% lower and in Example 3, 21% lower. Example 7 also demonstrates the desirability of using a flow promoter to further upgrade wear resistance at both 200° C. and 300° C. without a significant reduction in coefficient of friction.

EXAMPLE 8

Compositions were prepared and brake lining specimens were formed by the wet process described above. The compositions used were comprised of the following basic ingredients.

Friction material: Parts by wt.
  Asbestos fibers _____ 57.5
  Barium sulfate _____ 22.5
Binder, resin solids [1] _____ 20.0

[1] The resin solids were based on a liquid oil modified two-step phenolic novolak resin solution containing 70% by weight resin solids sold under the designation CRS by the Union Carbide Corporation. The liquid resin also contained 9 percent by weight, based on the weight of the phenolic resin solids, of thermoplastic polyarylene polyether prepared as described in Example 1 having a reduced viscosity of 0.49, and 10 percent by weight, based on the weight of the phenolic resin solids, of hexamethylenetetramine hardener. The polyarylene polyether was added to the liquid phenolic resin as a 30% solids solution of the polymer in methylene chloride solvent. The control composition was the same as used in the example minus the polyarylene polyether.

Two brake lining specimens of each composition were prepared and tested for coefficient of friction and wear factor at 200° C. and 300° C. Results are summarized in Table II.

TABLE II

|  | Coefficient of friction | | Wear factor | |
|---|---|---|---|---|
|  | 200° C. | 300° C. | 200° C. | 300° C. |
| Example 8 | 0.48 | 0.52 | 0.13 | 0.42 |
| Control | 0.48 | 0.44 | 0.13 | 0.44 |

EXAMPLE 9

In this example, the friction compositions and elements of this invention were tested for friction fade and recovery. Brake lining specimens were prepared as in Example 3 and as in the control for Examples 2–7. In testing for fade and recovery, the average of eight standard test cycles at 200° C. (390° F.) was taken as the baseline coefficient of friction. This was followed by a fade run with full heat on the drum of the friction tester. Friction was allowed to build up from 400° F. to 800° F. over a period of 15 to 20 minutes. Coefficient of friction data was recorded at 50° F. intervals and also at the temperature at which peak friction occurred. Finally, after lowering the drum temperature to 200° C. (390° F.),

TABLE I

| Example No. | Novolak resin molecular weight [1] | Percent hexamethylenetetramine | Percent polyarylene polyether | Coefficient of friction | | Wear factor | |
|---|---|---|---|---|---|---|---|
|  |  |  |  | 200° C. | 300° C. | 200° C. | 300° C. |
| 2 | 590 | 6.5 | 14.0 | 0.51 | 0.53 | 0.17 | 0.77 |
| 3 | 590 | 9.1 | 13.6 | 0.48 | 0.53 | 0.16 | 0.66 |
| 4 | 590 | 11.5 | 13.3 | 0.49 | 0.53 | 0.15 | 0.71 |
| 5 | 490 | 6.5 | 14.0 | 0.51 | 0.53 | 0.12 | 0.67 |
| 6 | 490 | 9.1 | 13.6 | 0.48 | 0.51 | 0.15 | 0.74 |
| 7 | 590 | [2] 6.2 | 13.2 | 0.48 | 0.51 | 0.13 | 0.66 |
| Control | 510 | 6.2 | 0 | 0.44 | 0.51 | 0.19 | 0.85 |

[1] Approximate average molecular weight.
[2] Also contained 5.6% hexatriphenol flow promoter.

eight addition standard test cycles were run to determine the degree of recovery of the baseline friction. Results are summarized in Table III.

TABLE III

|  | Coefficient of friction | |
| --- | --- | --- |
|  | Example 9 | Control |
| Baseline COF at 390° F | 0.45 | 0.41 |
| Fade run at— |  |  |
| 440° F | 0.48 | 0.48 |
| 490° F | 0.51 | 0.51 |
| 540° F | 0.52 | 0.52 |
| 590° F | 0.54 | 0.54 |
| 640° F | 0.57 | 0.54 |
| 690° F | 0.60 | 0.58 |
| 740° F | 0.62 | 0.64 |
| 760° F | 0.64 | 0.65 |
| Peak COF: |  |  |
| 775° F | 0.64 | 0.65 |
| 800° F | 0.62 | 0.61 |
| Recovery of baseline COF at 390° F | 0.45 | 0.38 |

Table III demonstrates that the friction compositions and elements of this invention exhibit a significantly higher baseline COF and a complete recovery of its baseline COF after a severe fade run as compared to the control which has a lower baseline COF and which recovered to 0.03 less than its baseline COF after the fade run indicating an undesirable glazing of the lining. Note also that this example demonstrates a superior resistance to fade after reaching the peak COF as compared to the control. This gives an indication of the superior staying powers of the friction compositions and elements of this invention.

EXAMPLE 10

Thermoplastic polyarylene polyether having the formula

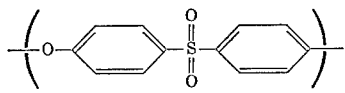

is prepared from 4,4'-dihydroxydiphenylsulfone and 4,4'-dichlorodiphenylsulfone according to the procedure in Example 1. This polymer is substituted for the polyarylene polyether in Example 6 and a composition and brake lining specimen is prepared by the dry process described herein. The brake lining specimen is characterized by superiority in friction and wear performance as compared to the control of Examples 2–7.

EXAMPLE 11

Thermoplastic polyarylene polyether having the formula

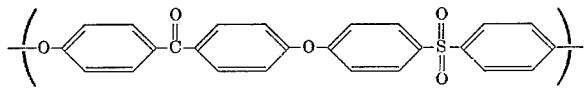

is prepared from the bisphenol of benzophenone and 4,4'-dichlorodiphenylsulfone according to the procedure in Example 1. This polymer is substituted for the polyarylene polyether in Example 4 and a composition and brake lining specimen is prepared by the dry process described herein. The brake lining specimen is characterized by superiority in friction and wear performance as compared to the control of Examples 2–7.

EXAMPLE 12

Thermoplastic polyarylene polyether having the formula

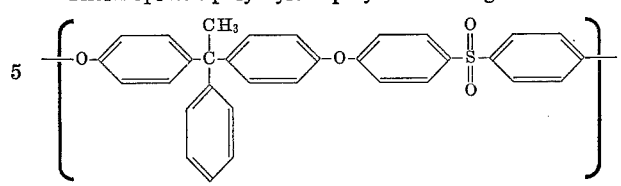

is prepared from the bisphenol of acetophenone and 4,4'-dichlorodiphenylsulfone according to the procedure in Example 1. This polymer is substituted for the polyarylene polyether in Example 8 and a composition and brake lining specimen is prepared by the wet process described herein. The brake lining specimen is characterized by superiority in friction and wear performance as compared to the control of Example 8.

EXAMPLE 13

Thermoplastic polyarylene polyether having the formula

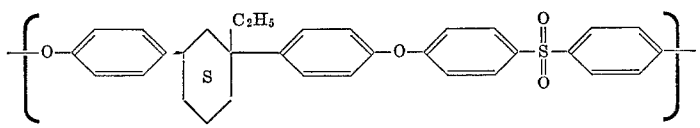

is prepared from the bisphenol of vinyl cyclohexene (prepared by an acid catalyzed condensation of 2 moles of phenol with one mole of vinyl cyclohexene) and 4,4'-dichlorodiphenylsulfone according to the procedure in Example 1. This polymer is substituted for the polyarylene polyether in Example 8 and a composition and brake lining specimen is prepared by the wet process described herein. The brake lining specimen is characterized by superiority in friction and wear performance as compared to the control of Example 8.

EXAMPLE 14

Thermoplastic polyarylene polyether having the formula

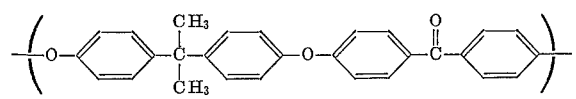

is prepared from 2,2'-bis(4-hydroxyphenyl)propane and 4,4'-difluorobenzophenone according to the procedure in Example 1. This polymer is substituted for the polyarylene polyether in Example 3 and a composition and brake lining specimen is prepared by the dry process described herein. The brake lining specimen is characterized by superiority in friction and wear performance as compared to the control of Examples 2–7.

I claim:

1. Friction composition comprising a major portion by weight of a particulate friction material the greater portion of which is a filamentous friction material and a binding amount of a binder comprising a heat-hardenable resin selected from the group consisting of phenol-aldehyde, amine-aldehyde, and amine modified phenolaldehyde resins and from about 1 to about 50 percent by weight, based on the weight of said resin, of a linear thermoplastic polyarylene polyether, composed of recurring units having the formula:

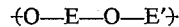

wherein E is the residuum of a dihydric phenol and E' is the residuum of a benzenoid compound having an inert electron withdrawing group, having a sigma* of above about +0.7 in at least one of the positions ortho and para to the valence bonds, and where both of said residua are valently bonded to the ether oxygens through aromatic carbon atoms.

2. Composition defined in claim 1 wherein said polyarylene polyether is composed of recurring units having the formula $$-\left(\underset{}{\bigcirc}^{(Y)_r} - R - \underset{}{\bigcirc}^{(Y_1)_z} - O - \underset{}{\bigcirc} - R' - \underset{}{\bigcirc}\right)-$$

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4, inclusive.

3. Composition defined in claim 1 wherein said polyarylene polyether is composed of recurring units having the formula $$-\left(-O-\bigcirc-\underset{CH_3}{\overset{CH_3}{\underset{|}{\overset{|}{C}}}}-\bigcirc-O-\bigcirc-\underset{O}{\overset{O}{\underset{||}{\overset{||}{S}}}}-\bigcirc\right)-$$

4. Composition defined in claim 1 wherein said polyarylene polyether is composed of recurring units having the formula $$-\left(-O-\bigcirc-\underset{O}{\overset{O}{\underset{||}{\overset{||}{S}}}}-\bigcirc\right)-$$

5. A preform adapted to be formed into a friction element formed from the composition of claim 1.

6. A preform adapted to be formed into a friction element formed from the composition of claim 3.

7. A friction element formed from the composition of claim 1.

8. A friction element formed from the composition of claim 3.

9. Friction composition comprising by weight, based on the weight of the composition, from about 70 to about 95 percent of a particulate friction material the greater portion of which is a filamentous friction material and from about 5 to about 30 percent of a binder comprising a heat-hardenable resin selected from the group consisting of phenol-aldehyde, amine-aldehyde, and amine modified phenolaldehyde resins and from about 1 to about 50 percent by weight, based on the weight of said resin, of a linear thermoplastic polyarylene polyether composed of recurring units having the formula $$-(O-E-O-E')-$$

wherein E is the residuum of a dihydric phenol and E' is the residuum of a benzenoid compound having an inert electron withdrawing group having a sigma* of above about +0.7 in at least one of the positions ortho and para to the valence bonds, and where both of said residua are valently bonded to the ether oxygens through aromatic carbon atoms.

10. Composition defined in claim 9 wherein said polyarylene polyether is composed of recurring units having the formula $$-\left(-O-\underset{}{\bigcirc}^{(Y)_r} - R - \underset{}{\bigcirc}^{(Y_1)_z} - O - \underset{}{\bigcirc} - R' - \underset{}{\bigcirc}\right)-$$

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value of from 0 to 4, inclusive.

11. Composition defined in claim 9 wherein said polyarylene polyether is composed of recurring units having the formula $$-\left(-O-\bigcirc-\underset{CH_3}{\overset{CH_3}{\underset{|}{\overset{|}{C}}}}-\bigcirc-O-\bigcirc-\underset{O}{\overset{O}{\underset{||}{\overset{||}{S}}}}-\bigcirc\right)-$$

12. Composition defined in claim 9 wherein said polyarylene polyether is composed of recurring units having the formula $$-\left(-O-\bigcirc-\underset{O}{\overset{O}{\underset{||}{\overset{||}{S}}}}-\bigcirc\right)-$$

13. A preform adapted to be formed into a friction element formed from the composition of claim 9.

14. A friction element formed from the composition of claim 9.

15. A brake lining formed from the composition of claim 11.

References Cited

UNITED STATES PATENTS

| | | | |
|---|---|---|---|
| 3,256,361 | 6/1966 | Harding | 260—838 |
| 3,355,272 | 11/1967 | D'Alessandro. | |
| 3,007,890 | 11/1961 | Twiss et al. | 260—38 |
| 3,130,172 | 4/1964 | Harvey et al. | 260—6 |

FOREIGN PATENTS

| | | |
|---|---|---|
| 650,476 | 1/1965 | Belgium. |

MORRIS LIEBMAN, Primary Examiner

L. T. JACOBS, Assistant Examiner

U.S. Cl. X.R.

188—251; 260—37, 39, 838, 849